US008057213B2

(12) United States Patent
Willett

(10) Patent No.: US 8,057,213 B2
(45) Date of Patent: Nov. 15, 2011

(54) MOULDING APPARATUS

(75) Inventor: Paul Eaton Willett, Whiteside (AU)

(73) Assignee: Moffat Pty Limited, Mulgrave Victoria (AU)

( * ) Notice: Subject to any disclaimer, the term of this patent is extended or adjusted under 35 U.S.C. 154(b) by 842 days.

(21) Appl. No.: 12/063,378

(22) PCT Filed: May 24, 2006

(86) PCT No.: PCT/AU2006/000689

§ 371 (c)(1),
(2), (4) Date: Feb. 8, 2008

(87) PCT Pub. No.: WO2007/022558

PCT Pub. Date: Mar. 1, 2007

(65) Prior Publication Data

US 2010/0166905 A1 Jul. 1, 2010

(51) Int. Cl.
*A21C 3/06* (2006.01)
*A21C 9/08* (2006.01)
*A21C 13/00* (2006.01)

(52) U.S. Cl. ............ 425/296; 99/353; 99/483; 425/317; 425/320; 425/332; 425/334; 425/363; 425/391

(58) Field of Classification Search .................. 425/320, 425/332, 334, 391, 317, 296, 363; 99/353, 99/468, 483
See application file for complete search history.

(56) References Cited

U.S. PATENT DOCUMENTS 2,450,033 A * 9/1948 Cohen ........................... 425/391
2,859,712 A * 11/1958 Kissinger ...................... 425/335
3,034,455 A * 5/1962 Roth et al. .................... 425/136
3,167,032 A * 1/1965 Rhodes ......................... 425/320
3,440,973 A * 4/1969 Lanham, Jr et al. ............ 99/483
3,604,367 A * 9/1971 Arries .......................... 425/297
3,677,393 A * 7/1972 Temple ......................... 198/795
3,986,446 A * 10/1976 Thompson et al. ............. 99/485
4,109,569 A * 8/1978 Kemper .......................... 99/483
4,373,892 A 2/1983 Nordmann
4,666,391 A * 5/1987 Watt et al. ..................... 425/320
4,966,071 A * 10/1990 Willett ....................... 425/302.1
4,971,545 A * 11/1990 Willett .......................... 425/321
4,976,600 A * 12/1990 Willett .......................... 425/321
4,994,293 A 2/1991 Hayashi
5,203,256 A * 4/1993 Mueller .......................... 99/475
5,330,344 A 7/1994 Konig
5,609,094 A 3/1997 Ueno et al.
6,393,974 B1 * 5/2002 Rodriguez et al. ........... 99/450.2
7,578,232 B2 * 8/2009 Hayashi et al. .............. 99/450.2

FOREIGN PATENT DOCUMENTS

GB 2110978 6/1983
GB 2219961 12/1989
WO WO 2004/030460 4/2004

* cited by examiner

*Primary Examiner* — James Mackey

(57) ABSTRACT

An apparatus for molding and proving dough, including a pair of sheet rollers for providing a dough strip to a dough molder, a means for engaging and disengaging a retractable dough divider, the retractable dough divider when engaged separates the dough into dough portions as its exits the dough molder and a prover for recovering the dough portions. Also disclosed is a dough molder for a strip of dough including a conveyor having a first run spaced below a curling mat to curl the dough strip; the curling mat resting on at least the first run of the conveyor, the curling mat having a raised section which does not contact the first run.

9 Claims, 7 Drawing Sheets

MOULDING APPARATUS

CROSS REFERENCE TO RELATED APPLICATION

The present application is the U.S. national stage application of International Application PCT/AU2006/000689, filed May 24, 2006, which international application was published on Mar. 1, 2007 as International Publication WO 2007/022558. The International Application claims priority of Australian Patent Application 2005904579, filed Aug. 23, 2005.

FIELD OF THE INVENTION

This invention relates to the pre-baking processing of bread dough and in particular an apparatus for pre-bake processing. In the production of bread in modern bakeries, the dough is required to go through a number of stages before it is in its final product form for baking. The stages include rolling, dividing (in the case of product such as rolls), shaping and proving. The stages are generally carried out in this order with each stage requiring a separate workspace and separate equipment.

BACKGROUND OF THE INVENTION

With the recent introduction of bakeries set up in commercial shopping outlets, a premium is placed on working space and flexibility of product production. As many of the products are produced in relatively small runs, the economics of a bakery of this type is generally improved if as many different types of product can be produced from as few of dough types as possible.

In the effort to diversify product lines from single dough sources, it is often desirable to use the same dough for loaf production as roll production. For roll production, this involves moulding the dough, dividing the dough into appropriate sized portions and then shaping the dough into final product form prior to baking.

Recently, the applicant has developed a baking process in which frozen dough is thawed and moulded prior to preparation into its final product form. In the case of rolls, the pressure moulded dough is divided and shaped prior to baking. The applicant has found that particularly for products made from frozen dough, it is preferable to allow the dough a period of time after being divided to relax prior to being rounded into a neat ball. However, in a conventional moulding apparatus, allowing time for the dough to prove either decreases the rate of production or increases the space required for preparation processes.

Ideally it would be preferable to be able to use the same apparatus to perform at least the common operations and selectively switch the apparatus to operations required to produce different products from substantially the same dough types.

SUMMARY OF THE INVENTION

Accordingly the present invention provides an apparatus for moulding and proving dough, including at least one pair of sheeting rollers for providing a dough strip to a dough moulder of a required thickness, a means for engaging a retractable dough divider, the dough divider separating the dough from the dough moulder into a plurality of dough portions and delivering the dough portions to a prover, the engagement means being able to disengage the dough dividers enabling the dough from the moulder to bypass the prover.

The engagement means may be an actuator which positions the retractable dough divider in the path of the dough or retracts the dough dividers.

The apparatus of the invention is able to provide an operation with the option of dividing the dough into a plurality of dough portions for product such as rolls or allowing the dough to remain intact for the production of bread loaves. This is particularly advantageous for providing flexibility and product selection when the feed to the apparatus is a standard weight of dough. When the dough is to be divided, the dough is given sufficient time in the prover for the dough to be relaxed after the stress of being divided, in preparation for shaping in the roll rounder.

The dough moulder preferably includes a first run spaced below a curling mat to curl the dough strip. The dough moulder may further include a second run and a pressure board for controlling the diameter of the curled dough piece. The exit end of the pressure board may be provided with the dough dividers which separate the dough into a plurality of dough portions and pass the plurality of dough portions to at least one tray of the prover.

In a preferred form of the invention, the prover includes a plurality of trays carried on a conveyor, the conveyor describing a closed circuit delivering the dough portions to a roll rounder after a predetermined period of time. The closed circuit described by the conveyor of the prover preferably raises the dough portions to a height above the roll rounder before feeding or dropping the dough portions into the roll rounder.

The actuator of the retractable dough dividers pivots the retractable dough dividing blades into the path of the dough on the pressure board to separate the dough into the plurality of dough portions. The divided dough portions then pass through dough separators to the trays of the dough prover. The apparatus may further include a diverter tray insertable into the path of the dough at the exit end of the pressure board. The insertion of the diverter tray into the path of the dough causes the dividing blades to be pivoted to a retract position out of the path of the dough and blocks passage of the dough to the prover.

In a preferred form of the invention, the moulder and prover is provided within a housing, the prover receiving separated dough portions below the moulder and conveying trays containing the dough portions up to a cross conveyor. The cross conveyor then feeds the dough portions into a dough rounder.

In another aspect of the invention, the applicant has found that when moulding elongate dough strips after the leading edge of the strip begins to roll into a ball, contact of the trailing edge of the dough under the curling mat causes the trailing edge to roll under the dough strip producing dough with rolls at both ends (FIG. 5). Such a rolled dough produces unsatisfactory product. to overcome this problem the applicant has found that by having a raised section in the curling mat, the trailing sections of the dough strip is not contacted by the curling mat and therefore prevented from curling.

According to this aspect, there is provided a dough moulder for a strip of dough including

- a conveyor having a first run spaced below a curling mat to curl the dough strip
- the curling mat resting on at least a portion of the first run of the conveyor, the curling mat having a raised section which does not contact the first run.

In a preferred form of the invention, the curling mat is preferably a chain linked sheet which is supported at one or both ends. The raised section preferably has a beginning and end edge and the raised section is supported above the first run at the beginning and end edge.

A guide is preferably provided on either side of the curling mat to retain the curling mat in position relative to the first run. The guide may be provided with a support which fits beneath the curling mat at the beginning and end edges to support the raised section above the first run.

The curling mat preferably has an entry section where dough strips placed on the first run pass beneath the curling mat. The frictional contact between the moving dough and the leading edge of the dough strip to curl thereby raising the curling mat. The dough which is curling and rolling under the curling mat continues past the beginning edge of the raised section. As the dough progresses up the raised section under the curling mat, the trailing edge of the dough passes the beginning edge of the raised section and is no longer subjected to the frictional forces or weight of the curling mat, and a curl on the trailing edge is no longer able to form.

It is preferable that the beginning edge of the raised section is not at the leading end of the curling mat. This allows the dough to be picked up and rolled prior to encountering the beginning edge of the raised section.

As the end of the curling mat is usually beneath the sheeting rollers, it is preferable that the beginning end of the raised section is in proximity to but not beneath the sheeting rollers.

BRIEF DESCRIPTION OF THE DRAWINGS

Further features, objects and advantages of the present invention will become more apparent from the following description of the preferred embodiment and accompanying drawings in which:

FIG. 3(*a*) is an expanded view of end 23 of the second run with the tray in;

FIG. 3(*b*) is an exploded view of end 23 of the second run with the tray out;

DETAILED DESCRIPTION OF THE EMBODIMENTS

Figure 1:
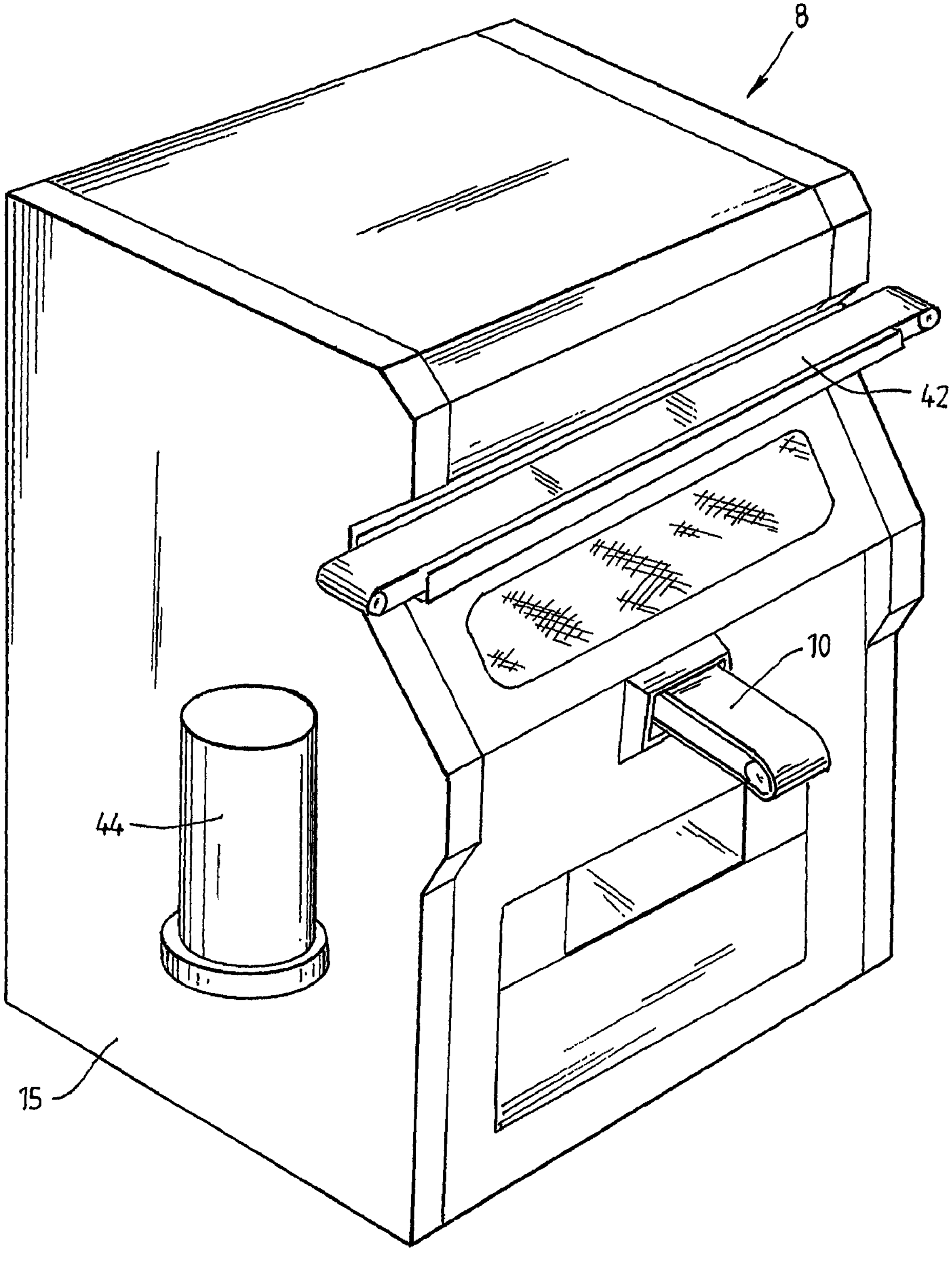
FIG. 1 is a front view of a moulder in accordance with the invention.
Figure 2:
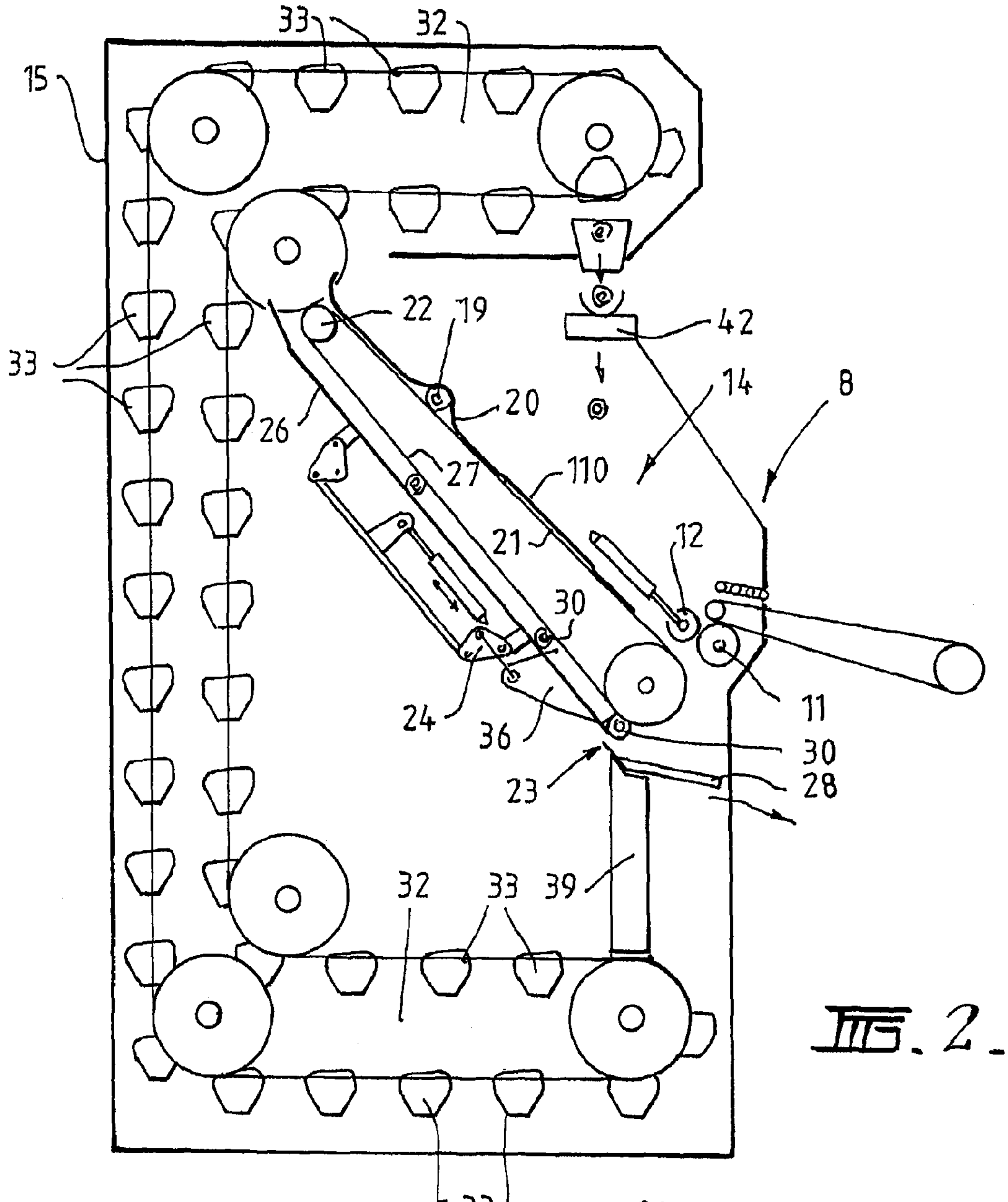
FIG. 2 is a schematic side view of the invention with the dough dividers set for roll preparation.
Figure 5:
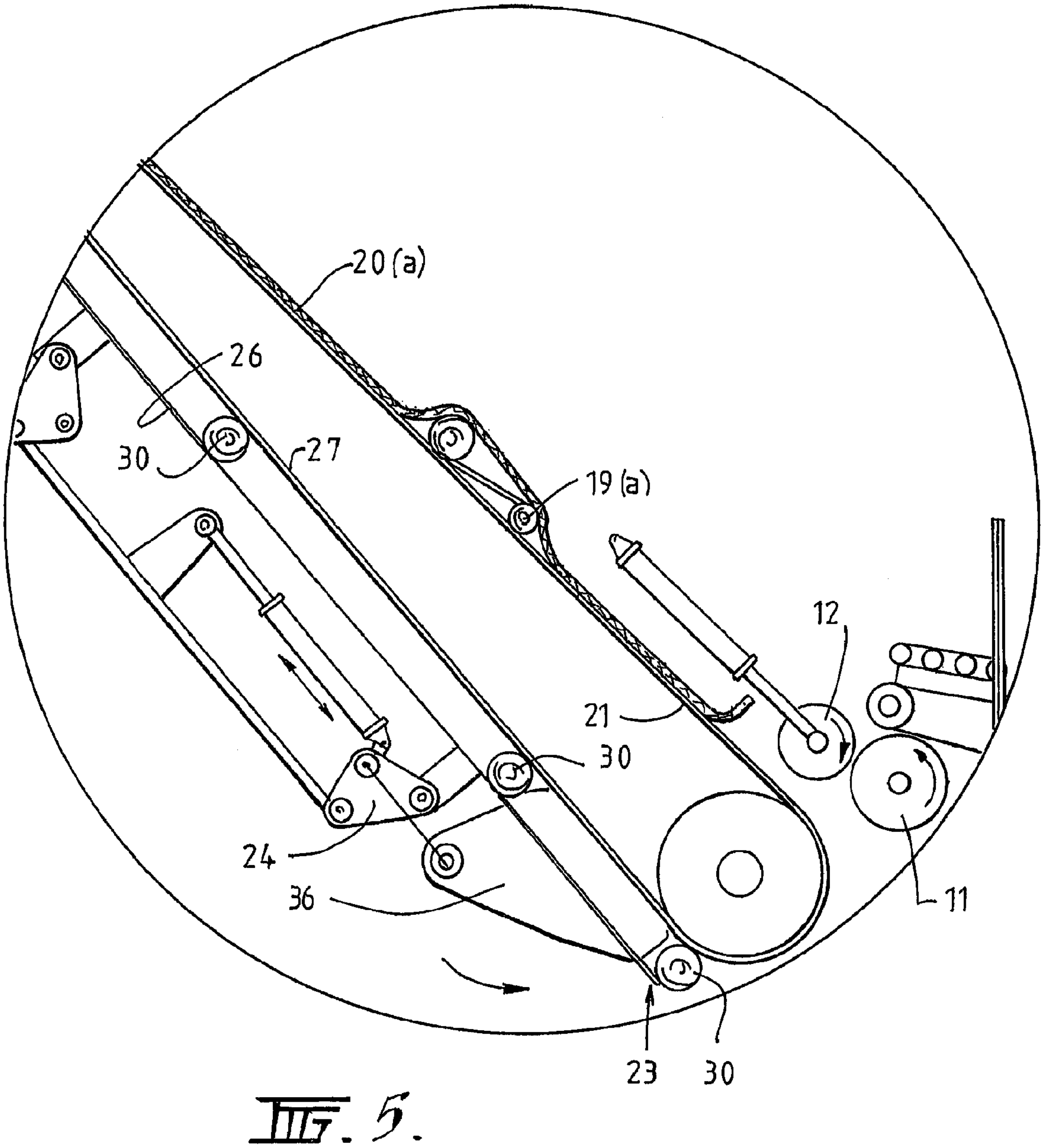
FIG. 5 is a schematic view of a curling mat operation with a strip of dough and without a raised section.

Referring to the drawings the apparatus in accordance with the invention includes a moulder and prover 8 having sheeting rollers 11, 12 through which dough pieces are fed to sheet the dough into a thin consistent thickness. If the dough is to be a thawed, frozen dough, it is ideal that the dough is first thawed and then allowed to prove prior to being fed onto the feeding belt 10 for the sheeting rollers 11, 12. The dough strip which preferably has the dimensions of 350 mm long, 100 mm wide and 10-12 mm thick, then engages a first run 21 spaced below a curling mat 20. The first run 21 and curling mat 20 cooperate to curl the dough strips as illustrated in FIG. 2. The curling mat 20 which is preferably a metal chain linked sheet rests on the inclined first run 21 of the dough conveyor. It is generally supported from its uppermost end and draped along the first run 21. The weight of the curling mat and the frictional contact between the curling mat and the dough moving along the dough conveyor causes the leading edge of the dough strip to fold back onto the dough and thereby initiate a curling motion as shown in FIG. 5. However, a conventional curling mat 20(*a*) is pliable and supported by the dough and the first run 21 and so, the weight of the curling mat 20(*a*) on the trailing edge of the dough has been found to cause the trailing edge to fold under the dough and subsequently form a curl 19(*a*). Such a double curling has been found to produce unsatisfactory product.

Figure 6:
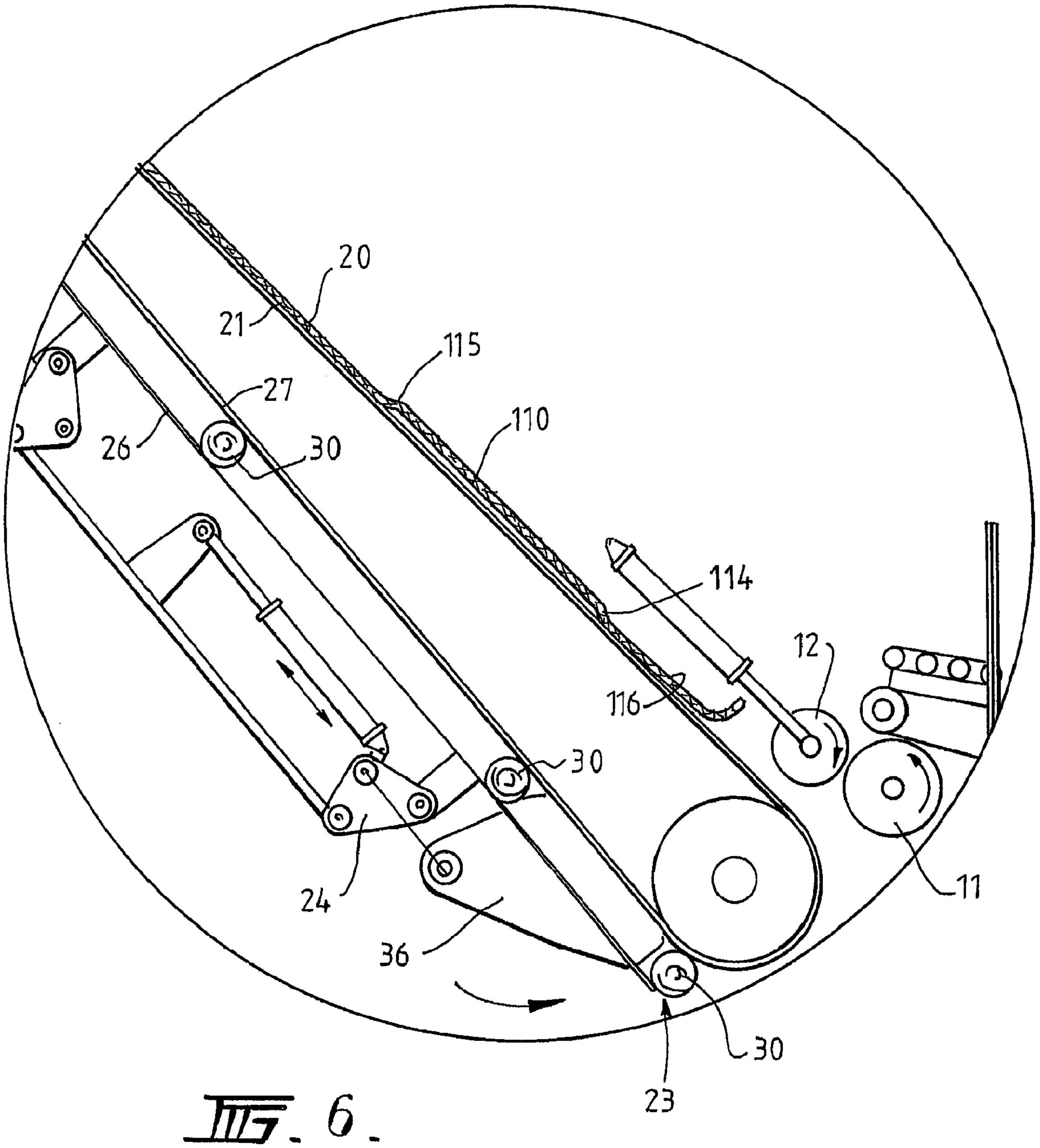
FIG. 6 is a schematic view of the lower section of the moulder showing the raised section.

To overcome this problem, the curling mat 20 is provided with a raised section 110 (FIG. 6). The moulder 14 generally has a guide 111 on either side of the conveyor to retain the curling mat 20 in position relative to the first run. The guide is provided with supports 112, 113 which fit between the curling mat and the first run to raise that section of the curling mat to form a beginning edge 114 and end edge 115 of the raised section 110.

The supports 112, 113 are preferably made from low friction material such as nylon and extend approximately 20 mm onto the first run which is typically 300 mm wide. The first run, slides past the lower surface of the supports 112, 113.

Figure 7:
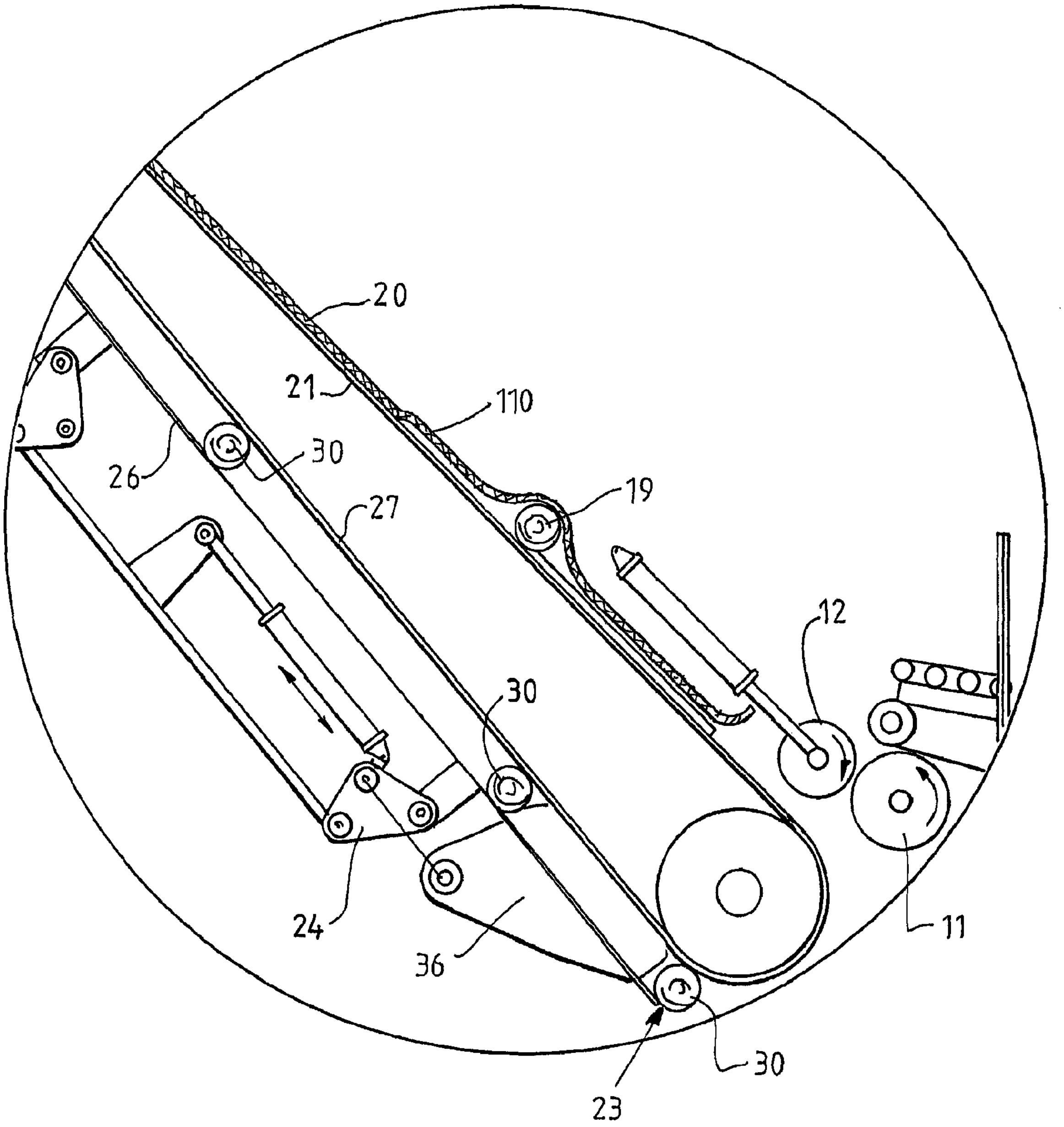
FIG. 7 is a schematic view of FIG. 6 showing a dough strip in the raised section of the curling mat.

The raised section has a beginning or lower edge 114 position, in proximity to but not beneath the sheeting rollers to produce an entry section 116 of the curling mat. This enables the leading edge to contact the curling mat and begin rolling as it progresses up the first run (FIG. 7). The height of the rolled dough is able to maintain the entry section of the curling mat above the trailing end of the dough for a brief period of the passage of the dough up the first run.

Figure 8:
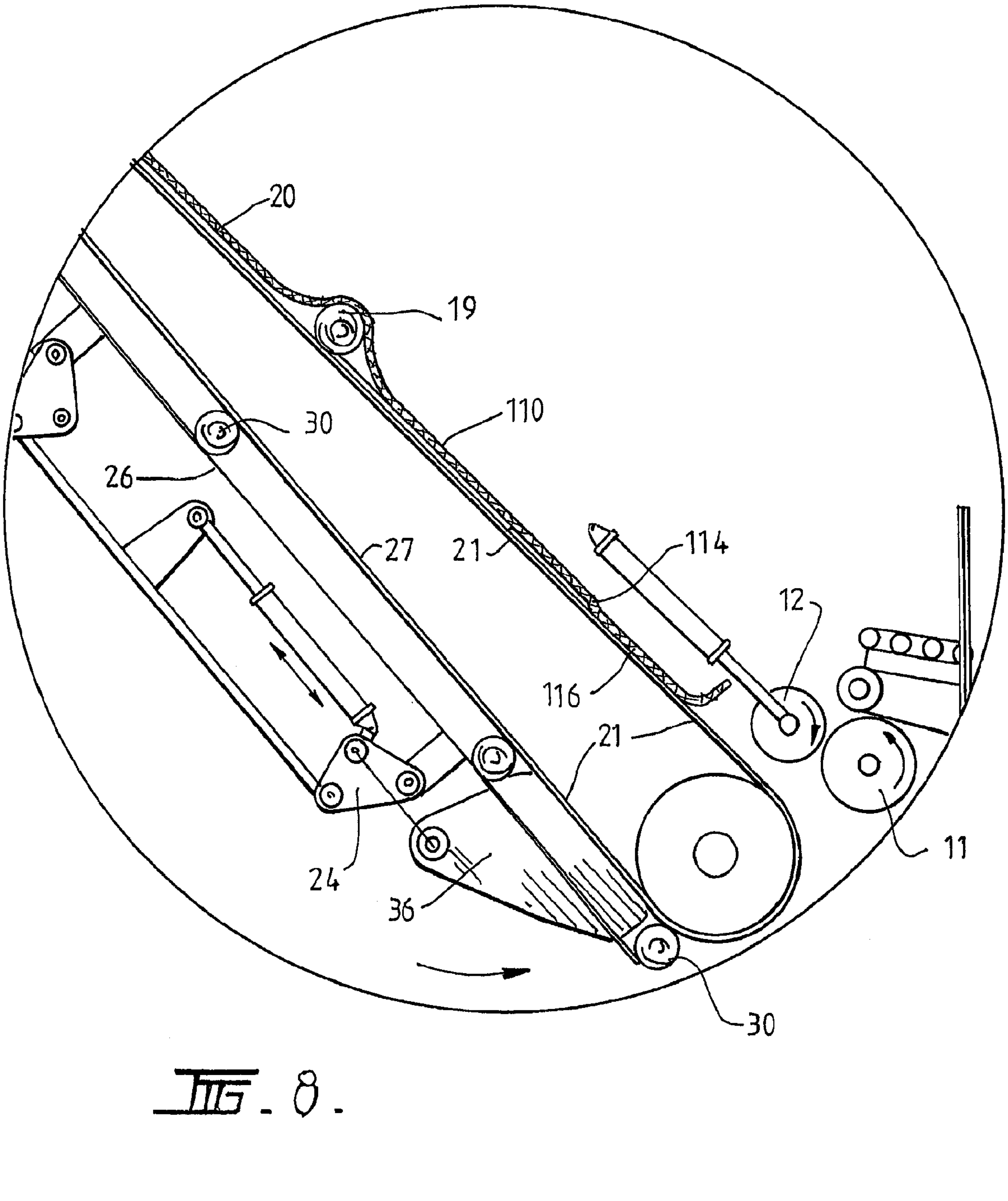
FIG. 8 is a schematic view of FIG. 6 showing the rolled dough departing the raised section.

After the rolled dough has progressed up the first run a sufficient distance, the curling mat normally would begin to collapse onto the first run. The raised section maintains a space for the trailing edge of the dough to prevent sufficient contact with the curling met which would normally result in the trailing edge of the dough rolling (FIG. 8).

Once the rolled dough 19 has progressed passes the end or upper edge 115 of the raised section 110, the trailing edge should be rolled with the rest of the dough.

The curled dough piece 19 passes around the tail roller 22 of the conveyor belt and a pressure board 26 which is adjustable to enable a gap between the second run 27 of the conveyor belt and the pressure board 26 to be adjusted. An actuator 24 engages with dough dividers enabling dough dividing blades 36 to pivot into the path of the dough as it passes to the exit end 25 of the pressure board 26. These dough dividing blades 36 are able to be withdrawn out of the pressure board slots 37 to enable loaves to be moulded from the undivided rolled dough. When the roll dividing blades 36 are required to be in the withdrawn position, a diverter tray 28 for the loaf pieces is pushed forward closing off the dough separator conduit 39 and directing the dough piece 30 to the front of the machine for placing into tins as loaves (FIG. 3(*a*)).

Figure 3A:
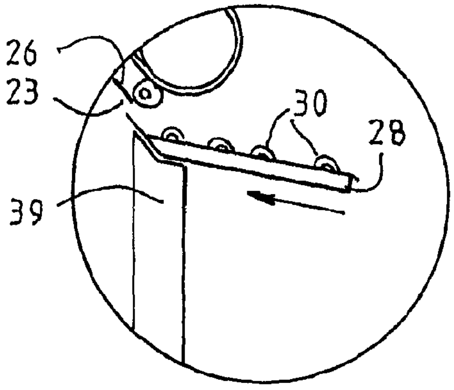
Figure 3B:
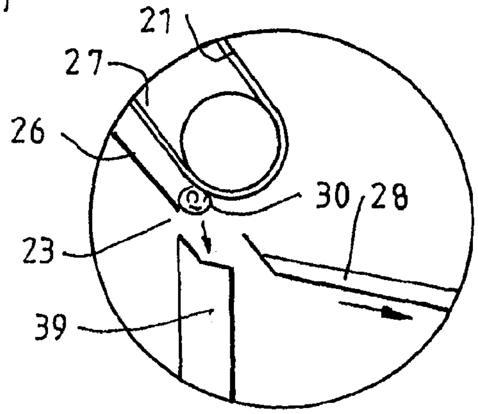
Figure 4:
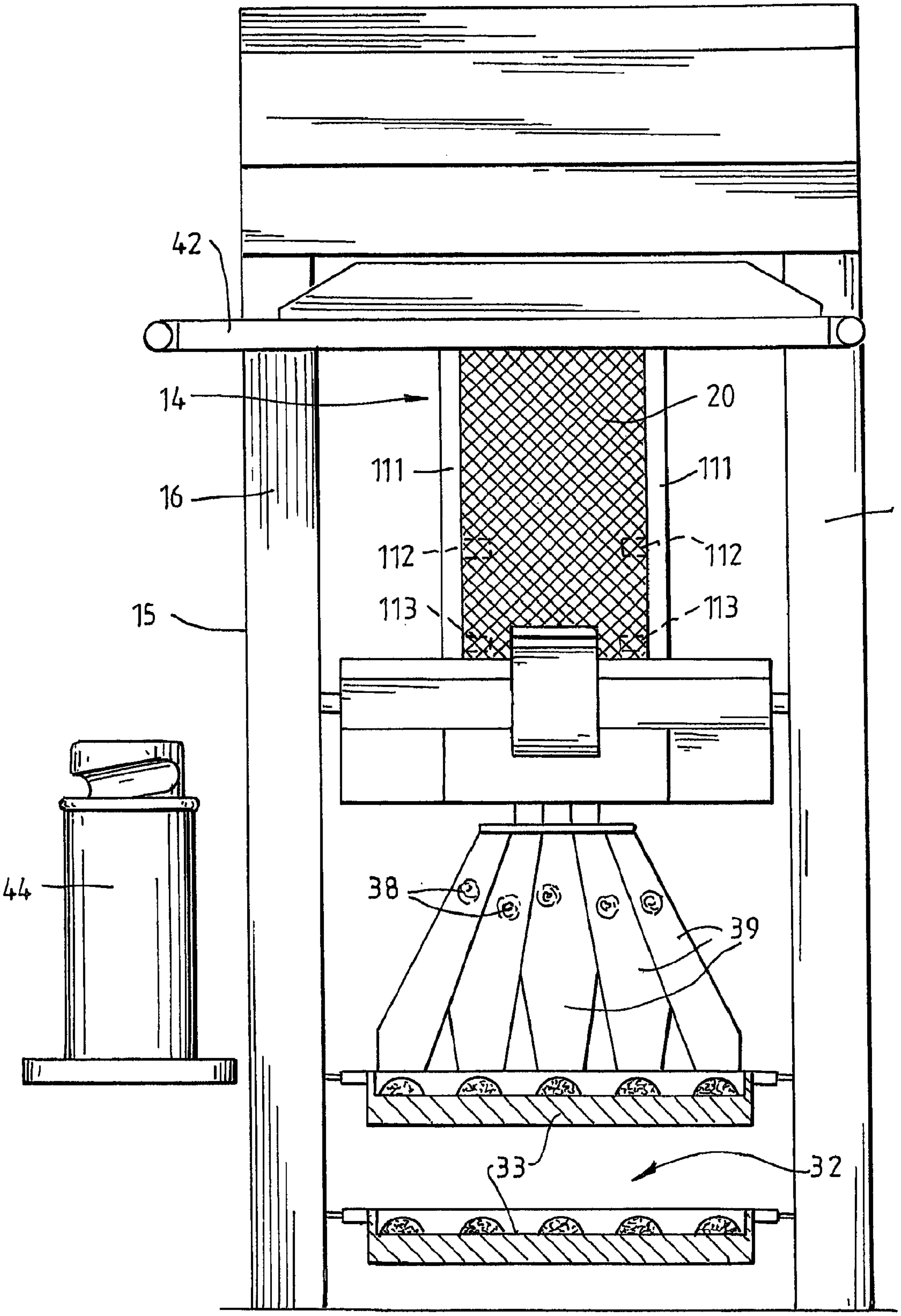
FIG. 4 is a front view of the moulder within a cabinet.

The actuator 24 may be operated by simply pushing the tray into the position shown in FIG. 3(*a*) under the exit end 23 of the second run or removing the tray allowing the dividing blades 36 to pivot back into position allowing the divided dough portions to pass to dough separators 39 and the prover.

Alternatively, the actuator may be manually operated by the baker or suitably trained operator. In this situation, if the divider position does not correspond with the intended final product type an alarm or warning may sound requesting attention by the operator.

When rolls are required as shown in FIG. 2(*b*), the tray 28 is in a withdrawn position and the dough dividers 36 extend through slots 37 in the pressure boards. As the dough progresses to the exit end 23 of the pressure board 26, the dough is separated into predetermined dough portions 38 and is passed by roll separators 39 into trays 33 of a conveyor. The tray 33 preferably collects a row of dough pieces all cut from the same rolled dough sheet 30 and transports the dough portions 38 via conveyor 32 from below the dough moulder 14, behind the moulder 14 and up to an outfeed belt 42. The speed of the conveyor is adjusted to provide sufficient proving time for the dough portions 38 to relax after being divided. Generally a time period of two to fifteen minutes is required for the dough portions 38 to rest before being passed via outfeed belt 42 to the pop-up roller 44 for further rounding or shaping. After rounding, the roller dough portions is then able to pass to the ovens for baking.

As the prover has about 30 trays and so will hold approximately 150 roll pieces, in a batch operation, the prover can be filled and the rolls can be trayed up as they exit the roll rounder. If longer rolls are required the roll portions can be removed from the prover outfeed belt 42 and fed back into the moulder 14 instead of allowing them to reach the rounder 44.

For the purposes of safety, hygiene and manufacturing economy, it is preferred that the moulder 14, roll divider 36, prover 32 and optionally the rounder 44 be manufactured within a housing 14 with all access to the mechanical parts of the apparatus being via doors (not shown) on the side of the machine. The housing includes an internal support frame 16, 17 and supports (not shown) for the moulder 14, pop-up rounder 44 and conveyor system 32. This is preferred to the costly method of finishing every machine to appear as a separate component. This also avoids the need to place safety guards on the many areas of each machine which can be a costly problem and easily avoided if all of the equipment is incorporated into a single cabinet 15.

The invention claimed is:

1. An apparatus for moulding and proving dough including:
- at least one pair of sheeting rollers for providing a dough strip:
- a dough moulder to roll the dough strip to form rolled dough;
- a disengageable dough divider to, when engaged, divide the rolled dough into dough portions; and
- a proofer including a mechanism configured to receive the dough portions and deliver the dough portions to an outfeed after a delay sufficient to recover the dough portions;
- wherein the dough moulder includes a dough conveyor for receiving the dough strip from the sheeting rollers, the dough conveyor having a first run in contact with a curling mat, the dough strip passing beneath the curling mat to roll the dough strip; and the curling mat including portions which rest on at least the first run of the conveyor, and a raised section raised from contact with the first run and spacing the portions along the first run.

2. An apparatus for moulding and proving dough including:
- at least one pair of sheeting rollers for providing a doth strip:
- a dough moulder to roll the dough strip to form rolled dough;
- a disengageable dough divider to, when engaged, divide the rolled dough into dough portions; and
- a proofer including a mechanism configured to receive the dough portions and deliver the dough portions to an outfeed after a delay sufficient to recover the dough portions;
- wherein the dough moulder includes a dough conveyor for receiving the dough strip from the sheeting rollers, the dough conveyor having a first run in contact with a curling mat, the dough strip passing beneath the curling mat to roll the dough strip, the curling mat being provided with a raised section which does not contact the first run; and

- a guide on either side of the curling mat to retain the curling mat in position relative to the first run, the guide being provided with a support positioned beneath beginning and end edges of the raised section to support the raised section above the first run.

3. An apparatus for moulding and proving dough including:
- at least one pair of sheeting rollers for providing a dough strip:
- a dough moulder to roll the dough strip to form rolled dough;
- a disengageable dough divider to, when engaged, divide the rolled dough into dough portions; and
- a proofer including a mechanism configured to receive the dough portions and deliver the dough portions to an outfeed after a delay sufficient to recover the dough portions;
- wherein the dough moulder includes a dough conveyor for receiving the dough strip from the sheeting rollers, the dough conveyor having a first run in contact with a curling mat, the dough strip passing beneath the curling mat to roll the dough strip, a second run and a pressure board for controlling the diameter of the rolled dough piece from the first run; and
- a diverter, the diverter being insertable into the path of the dough at an exit end of the pressure board, the insertion of the diverter into the path of the dough blocking passage of the dough to the proofer.

4. The apparatus of claim 3 wherein insertion of the diverter causes the dough divider to disengage out of the path of the dough.

5. An apparatus for moulding and proving dough including:
- at least one pair of sheeting rollers for providing a dough strip:
- a dough moulder to roll the dough strip to form rolled dough;
- a disengageable dough divider to, when engaged, divide the rolled dough into dough portions; and
- a proofer including a mechanism configured to receive the dough portions and deliver the dough portions to an outfeed after a delay sufficient to recover the dough portions;
- wherein the moulder and proofer are within a single housing, the proofer receiving separated dough portions below the moulder and conveying trays containing the dough portions up to a cross conveyor which feeds the dough portions to a dough rounder.

6. A dough moulder, for a strip of dough, including a conveyor, having a first run and a curling mat;
- the curling mat including portions which rest on at least the first run of the conveyor, and a raised section raised from contact with the first run and spacing the portions along the first run.

7. The apparatus of claim 6 wherein the curling mat is a chain linked sheet supported at one or both ends.

8. The apparatus of claim 6 further including a guide on either side of the curling mat to retain the curling mat in position relative to the first run, the guide being provided with a support positioned beneath beginning and end edges of the raised section to support the raised section above the first run.

9. The apparatus of claim 6 wherein the curling mat has an entry section where dough strips placed on the first run pass beneath the curling mat.

* * * * *